United States Patent [19]
Crawford

[11] 3,982,604
[45] Sept. 28, 1976

[54] STEERING AXLE

[75] Inventor: John T. Crawford, Lyndhurst, Ohio

[73] Assignee: Towmotor Corporation, Mentor, Ohio

[22] Filed: May 7, 1975

[21] Appl. No.: 575,099

[52] U.S. Cl. .............................. 180/158; 280/87 B
[51] Int. Cl.² ........................................ B62D 5/10
[58] Field of Search .............. 180/79.2 R, 158, 162; 280/87 B

[56] References Cited
UNITED STATES PATENTS

| | | | |
|---|---|---|---|
| 2,997,123 | 8/1961 | Barton | 180/79.2 R |
| 3,730,288 | 5/1973 | Dean | 180/79.2 R |
| 3,805,910 | 4/1974 | Hull | 180/79.2 R |

Primary Examiner—M. H. Wood, Jr.
Assistant Examiner—John A. Pekar
Attorney, Agent, or Firm—Phillips, Moore, Weissenberger, Lempio & Strabala

[57] ABSTRACT

A steering axle for use in a vehicle such as an industrial truck or the like comprises a center beam member having spindles mounted for pivotal movement at each end thereof for rotatably supporting a pair of wheels. A double-acting motor is secured to the axle between the spindles and is connected by steering links to the spindles. The hydraulic motor comprises a double-acting piston having its rods extending outward and connected at their ends to the axle beam member for stationary mounting of the piston. A cylinder is reciprocally mounted on the piston and rods and is connected at each end by means of a pair of links to a pair of steering arms for each of the spindles. The geometric relationship of the steering motor and the steering arms are such that the angles between the axis of the cylinder and the links connected to the steering arms will be equal when the spindles are such that wheels mounted thereon would be straight ahead or in the fully cramped position. This arrangement provides a compact arrangement having minimum stress on the steering components.

9 Claims, 5 Drawing Figures

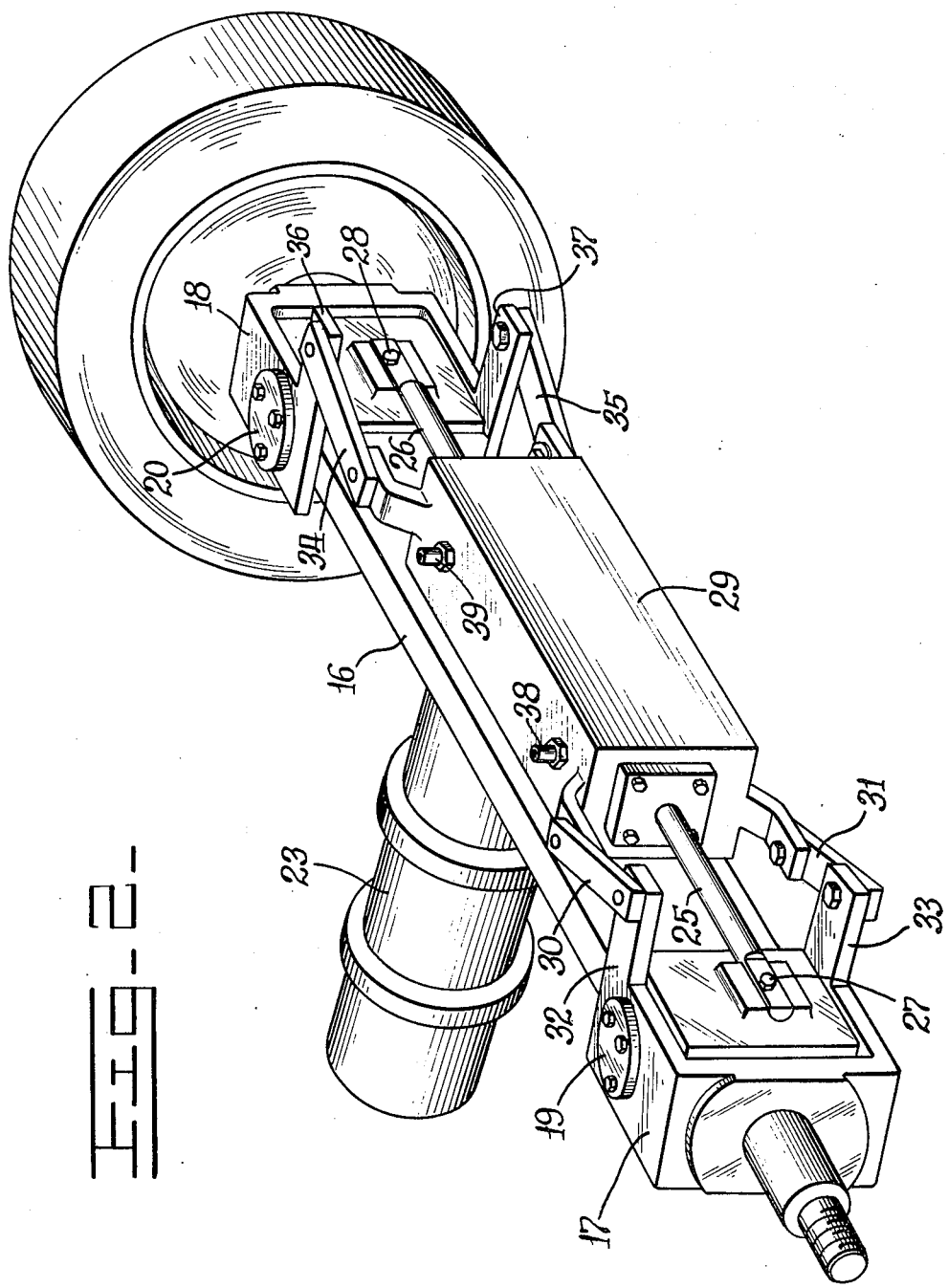

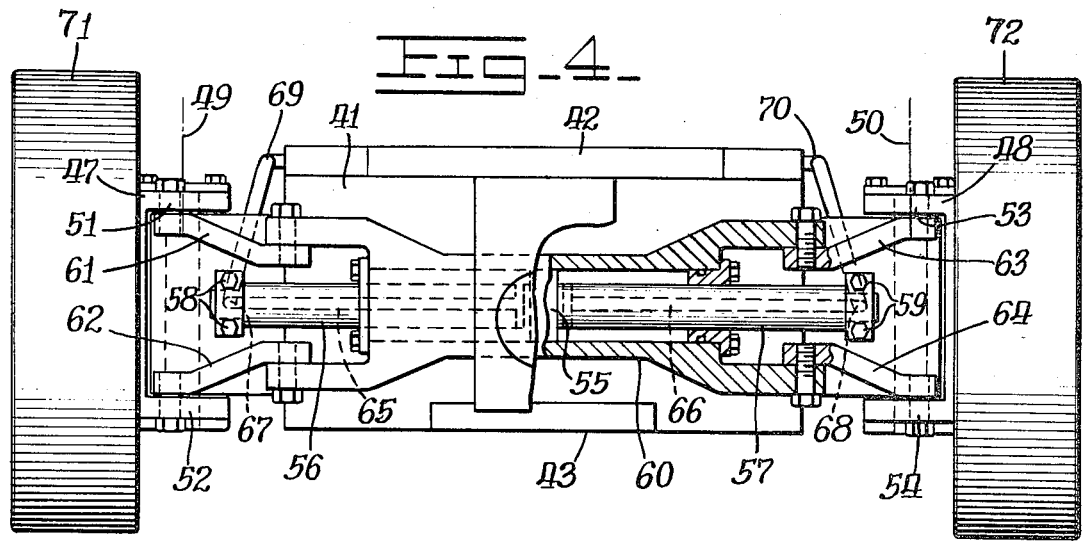
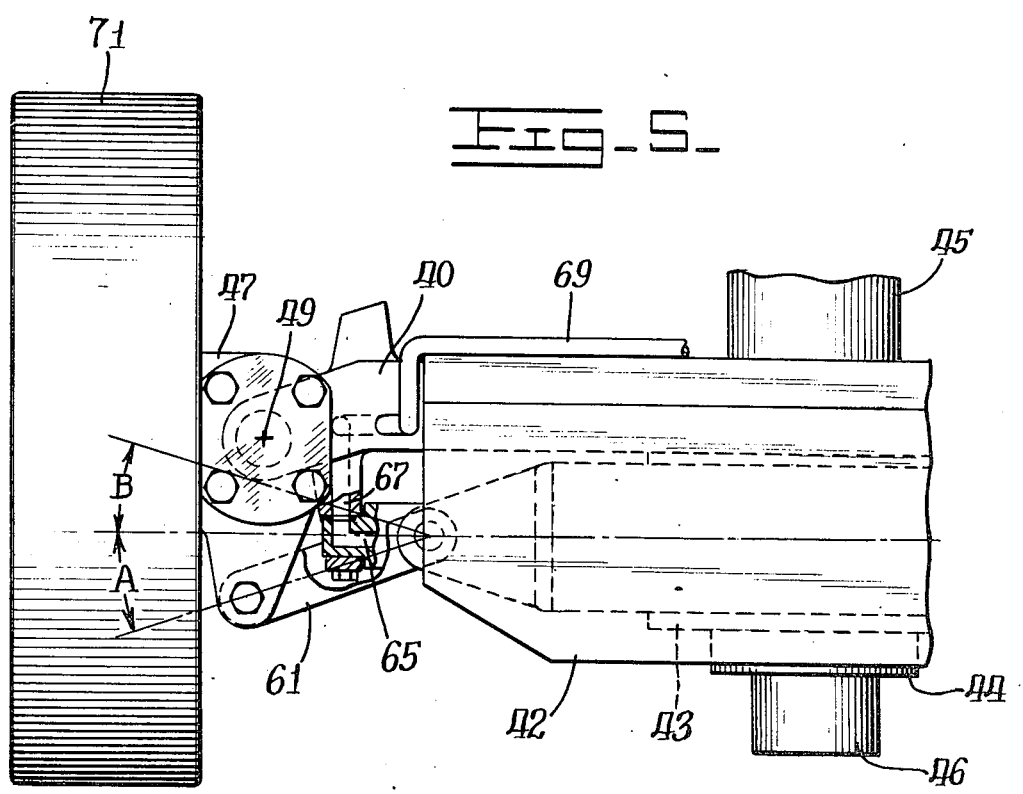

STEERING AXLE

BACKGROUND OF THE INVENTION

The present invention relates to steering axles and pertains particularly to a power steering axle assembly for industrial trucks or the like.

Vehicles such as industrial trucks and the like must be very maneuverable in order to function efficiently. In order to have a high degree of maneuverability the vehicle must have a short turning radius, which means that the steerable wheels of the vehicle must turn as much as possible. One problem with vehicles having steerable wheels with a high degree of steer is that one or more of the steerable wheels normally scuff during the turn, which causes rapid wear of the tires of the vehicle and also imposes high stresses on the steering components of the vehicle.

The known prior art steering axles do not have the geometric arrangement to overcome this scuffing problem or the high stress component problem. The prior attempts to solve these problems have provided arrangements of very complex and expensive constructions.

The prior art is exemplified by the following U.S. Pat. Nos. 3,480,100, issued Nov. 25, 1969 to Gaulke; 3,768,585, issued Oct. 30, 1973 to Matteo; and 3,805,910, issued Apr. 23, 1974 to Hull.

SUMMARY AND OBJECTS OF THE INVENTION

It is the primary object of the present invention to overcome the above problems of the prior art.

A further object of the present invention is to provide a steering axle that is compact and simple in construction that overcomes the above problems of the prior art.

Another object of the present invention is to provide a steering axle that is compact and has a geometric arrangement for reducing tire scuffing and reducing stresses on the components of the steering system.

Still another object of the present invention is to provide a steering axle arrangement wherein the components of the axle are geometrically arranged to reduce tire scuffing and to accommodate forces thereon without undue stress.

In accordance with the primary aspect of the present invention a steering axle for the vehicle is provided with a steering axle in which the double-acting piston of the steering axle is secured to the axle and the cylinder itself is reciprocally mounted on the piston and connected by linkage having a geometric arrangement such that forces on the linkage and steering cylinder are such that stresses are kept to a minimum.

BRIEF DESCRIPTION OF THE DRAWINGS

The above and other objects and advantages of the present invention will become apparent from the following description when read in conjunction with the drawings wherein:

FIG. 2 is a perspective view of a steering axle constructed in accordance with the present invention;

FIG. 4 is an elevational view partially in section of an alternate embodiment of the present invention with portions broken away to reveal details;

FIG. 5 is a plan view of a portion of the embodiment of FIG. 4 enlarged and with portions broken away to reveal details.

DETAILED DESCRIPTION OF PREFERRED EMBODIMENT

Figure 1:
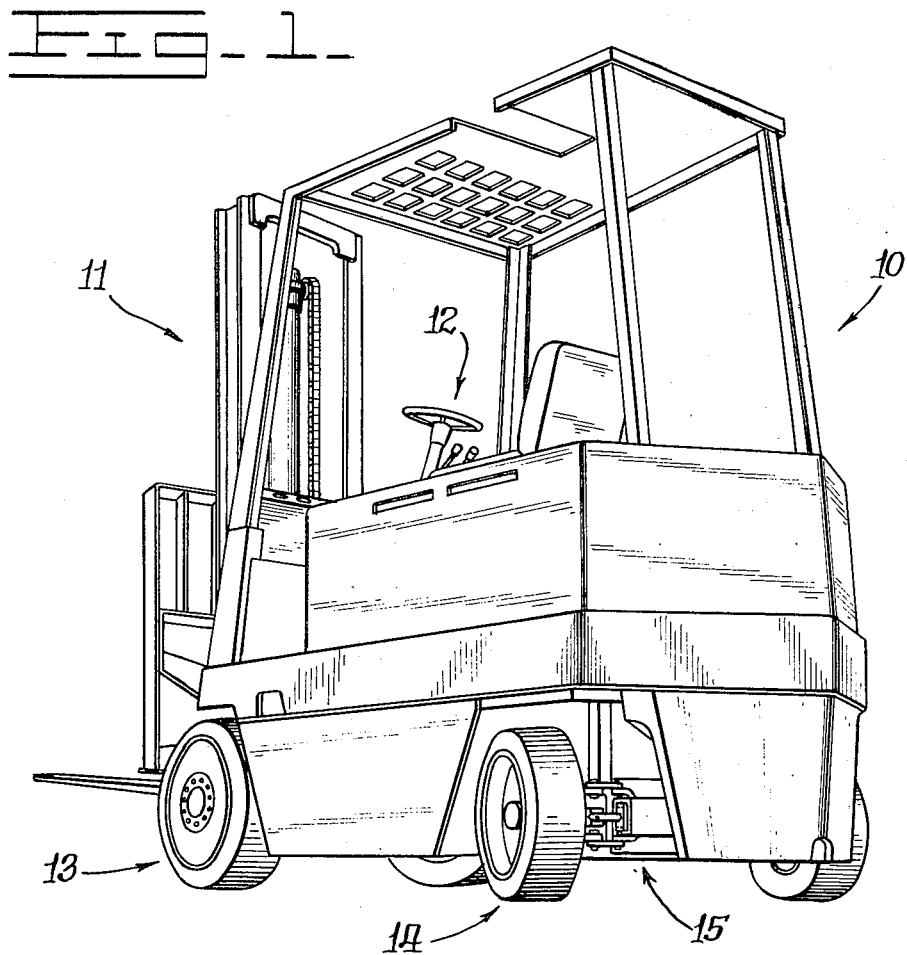
FIG. 1 is a perspective view of the vehicle incorporating a preferred embodiment of the present invention.

Turning specifically to FIG. 1, there is illustrated a vehicle indicated generally by the numeral 10 which vehicle is an industrial vehicle equipped as a lift truck having a lift assembly at the forward end thereof 11 with an operator station indicated generally at 12 having the usual steering wheel and other controls. The vehicle is a four-wheeled vehicle having ground-engaging wheels 13 at the front which are normally mounted on a nonsteerable drive axle and wheels 14 at the rear which are normally mounted on a steerable axle 15.

The steerable axle 15 comprises an elongated center beam or frame member 16 having spindles 17 and 18 pivotally mounted for pivotal movement about vertical axes 19 and 20 on each end of the beam. Wheels 21 and 22 are rotatably mounted on each of the spindles for engaging the ground and supporting the vehicle.

The axle 15 is mounted on a vehicle in a suitable manner, preferably by means of a pivotal support including a cylindrical trunnion shaft 23 located at the center of the axle both vertically and longitudinally. This permits the axle to pivot with respect to the vehicle about the axis of this shaft.

Figure 3:
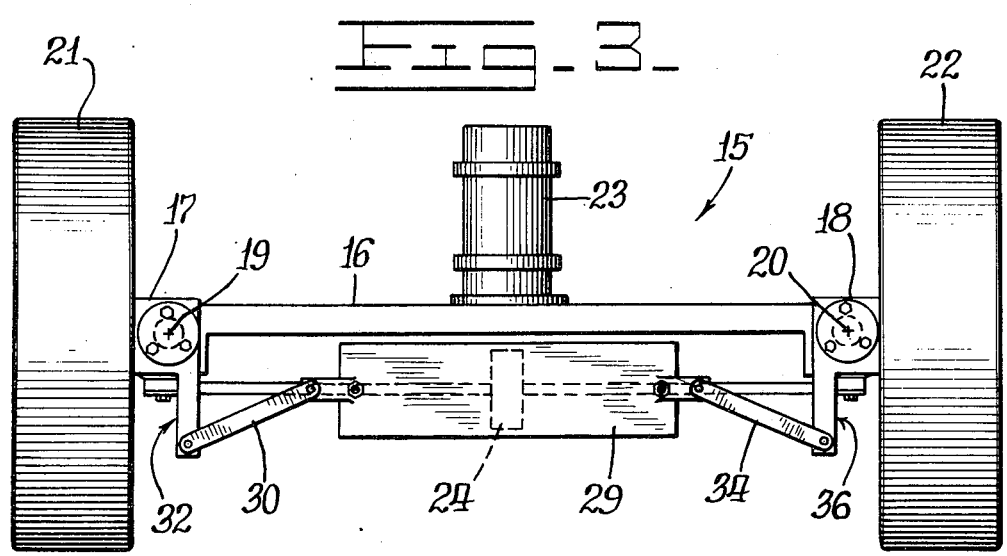
FIG. 3 is a plan view of the axle of FIG. 2.

The power steering assembly of the present axle assembly includes a suitable linear hydraulic motor or cylinder operatively connected by suitable linkage means to the spindles of the axle. The hydraulic motor includes a piston 24 as best seen in FIG. 3 of the double-acting type and including a pair of piston rods 25 and 26 one of which extends from each end of the piston and each of which is secured by suitable means at its outer end to portions of the axle beam or frame 16. These rods 25 and 26 are secured such as by means of bolts 27 and 28 directly to the beam or frame 16.

A cylinder 29 is reciprocally mounted on the piston 24 and rods 25 and 26 and is connected by a pair of links 30 and 31 at one end to steering arms 32 and 33 to spindle 17 and is connected at the other end by suitable links 34 and 35 to arms 36 and 37 of spindle 18.

It should be noted from FIG. 3, for example, that the links 30, 31 and 34, 35 are fairly short in relation to the length of the axle beam 16. These links are, for example, less than one fourth of the beam 16. This provides a compact arrangement of the links and because of their short length the force on the cylinder and on the steering arm is at a better angle resulting in better force distribution and less bending moment on the piston rods. It will also be noted that the cylinder as it moves to the left, for example, will move closer to the spindle 17 and thus reduce the overhang of the piston rod on that side of the assembly resulting in less bending moment on the piston rod.

It should also be noted that when the wheels are centered in this embodiment the links extend at an angle to the axis of the cylinder or piston rods and act at angles to the steering arms 32, 33 and 36, 37, as specifically described later.

It should also be noted that each of the spindles 17 and 18 substantially symmetrical about the center longitudinal axis of the beam 16 and each includes a lever arm at the upper end of its supporting axis and at the lower end of its supporting axis. The steering motor and cylinder 29 is mounted centrally within the vertical dimensions of this assembly and includes two links at each end thereof, each spaced on opposite sides of the cylinder rod at substantially equal distances to thereby equalize the forces acting between the spindle and cylinder on each side of the cylinder rod and thus eliminate moments about the cylinder rod. This arrangement eliminates the long levers and long tie rods of some prior art embodiments. Thus, this construction provides a more compact and simple arrangement of a steering axle assembly. Suitable conduit means 38 and 39 are provided for communicating fluid to each end of the cylinder 29 for operation of the motor.

Turning now to the embodiment of FIGS. 4 and 5, the axle comprises a central beam or frame member 40 having a rear vertically extending wall member 41 with upper and lower wall members 42 and 43 extending therefrom in the same direction with another vertically extending wall member 44 extending therebetween in spaced relation to the first vertically extending wall member 41 to form a substantially box-like structure on a frame assembly. Trunnion means comprising a pair of spaced-apart coaxially disposed shaft members secured to each side of the box-like section 45 and 46 are provided for mounting the axle assembly to a vehicle.

A pair of spindle assemblies 47 and 48 are pivotally mounted for pivotal movement about vertical axes at 49 and 50 at each end of the axle beam 40. Each of the spindle assemblies 47 and 48 rotatably mounts a wheel 71 and 72 respectively.

Each of the spindles 47 and 48 includes a pair of steering arms 51, 52 and 53, 54 respectively.

A linear hydraulic motor or cylinder assembly includes a piston 55 of the double-acting type having a piston rod 56 and 57 respectively extending from each end thereof and secured respectively at their outer ends by suitable means such as bolts 58 and 59 to the axle beam or frame member 40. A cylinder 60 is reciprocally mounted on the piston 55 and the rods 56, 57 and is operatively connected by suitable means such as connecting rods 61, 62, 63 and 64 to the steering arms 51, 52, 53 and 54 respectively.

It will be noted that this embodiment, as in the previous embodiment, includes a pair of links at each end of the cylinder spaced an equal distance from the piston rod as in the previous embodiment to balance the forces acting thereon. It should be noted from the FIG. 5 illustration that the axis of the cylinder 60 is offset from the pivotal connections of the links 61, 62, 63 and 64 from the respective steering arms so that when the wheels are in a straight forward direction an angle "A" is established between the links and the axis of the cylinder 60. Upon turning the wheel 71 to the fully cramped position as partially illustrated in phantom in FIG. 5, an angle "B" exists between the links 61, 62 and the center axis of the cylinder 60. The geometry of this embodiment is selected such that these angles "A" and "B" are approximately equal. Thus, the force acting through the cylinder on the piston rods during a steering maneuver is equalized. It should also be noted that the geometry of both embodiments is such that the inside wheel during a turning maneuver will turn a greater degree than the outside wheel because of the shorter required radius thereof.

In this FIGS. 4 and 5 embodiment, conduit means for communicating pressurized fluid to the inside of the cylinder 60 for operation thereof comprises conduit means or passageways 65 and 66 formed respectively in the piston rods 56 and 57. These passages are in turn communicated with passages 67 and 68 formed in axle beam 40. Suitable conduit 69 and 70 then communicate with the passages 67 and 68 and with a suitable source of fluid for steering the vehicle.

From the above description it will be appreciated that there is disclosed a steering axle assembly for a vehicle which assembly includes an elongated main frame with a spindle for rotatably supporting a wheel pivotally secured at each end of the frame and a steering motor assembly having a stationary piston and a movable cylinder connected by suitable linkage means to steering arms of the spindle means for steering or turning the spindles of the axle. The geometry of the assembly is such as to provide a very compact and rugged assembly as well as to minimize the forces acting on the steering piston and linkage.

While the present invention has been described by means of specific embodiments, it is to be understood that numerous changes and modifications may be made therein without departing from the spirit and scope of the invention as defined in the appended claims.

What is claimed is:

1. A steering axle assembly for a vehicle, said assembly comprising:
    an elongated main frame;
    a spindle for rotatably supporting a wheel secured to each end of said main frame for pivotal movement about a vertical axis;
    a steering arm connected to each of said spindles;
    a steering motor and linkage assembly mounted between said steering arms;
    said steering motor comprising a stationary double-acting piston having an elongated piston rod extending from each end thereof, each of said piston rods secured at its outer end to said main frame, and a cylinder reciprocably mounted on said piston and said rods; and
    link means pivotally connecting each end of said cylinder to one of said steering arms, and wherein said link means are less than one-fourth the length of said main frame.

2. The steering axle of claim 1 wherein said rods include conduit means formed therein for communicating fluid to said cylinder.

3. The steering axle of claim 1 wherein said steering motor is confined within the vertical dimensions of said main frame.

4. The steering axle of claim 1 wherein said link means comprises a pair of links pivotally connected to each end of said cylinder and to a pair of arms for each spindle.

5. A steering axle assembly for a vehicle, said assembly comprising:
    an elongated main frame;
    a spindle for rotatably supporting a wheel secured to each end of said main frame for pivotal movement about a vertical axis;
    a steering arm connected to each of said spindles;
    a steering motor and linkage assembly mounted between said steering arms;
    said steering motor comprising a stationary double-acting piston having an elongated piston rod extending from each end thereof, each of said piston rods secured at its outer end to said main frame, and a cylinder reciprocably mounted on said piston and said rods; and link means pivotally connecting each end of said cylinder to one of said steering arms, and wherein the location of the steering motor with respect to the pivotal connection of the spindles to the axle frame, the length of the steering arms, and the length of the links are such that the angle between the axis of the cylinder and the link when a wheel on the spindle is straight ahead is equal to the angle between the cylinder axis and the link when the wheel is in the fully cramped position.

6. The steering axle of claim 5 wherein said link means comprises a pair of links pivotally connected to each end of said cylinder and to a pair of arms for each spindle.

7. The steering axle of claim 6 wherein said links are less than one-fourth the length of said main frame.

8. The steering axle of claim 7 wherein said rods include conduit means formed therein for communicating fluid to said cylinder.

9. The steering axle of claim 8 wherein said steering motor is confined within the vertical dimensions of said main frame.

* * * * *